United States Patent

Blum

[15] 3,688,190
[45] Aug. 29, 1972

[54] DIFFERENTIAL CAPACITANCE CIRCUITRY FOR DIFFERENTIAL PRESSURE MEASURING INSTRUMENTS

[72] Inventor: Michael J. Blum, Fullerton, Calif.
[73] Assignee: Beckman Instruments, Inc.
[22] Filed: Sept. 25, 1970
[21] Appl. No.: 75,596

[52] U.S. Cl. .............................................. 324/61 R
[51] Int. Cl. ............................................. G01r 27/26
[58] Field of Search ........................... 324/57, 60, 61

[56] References Cited

UNITED STATES PATENTS

| | | | |
|---|---|---|---|
| 3,435,317 | 3/1969 | Osborn | 340/200 |
| 3,271,669 | 9/1966 | Lode | 324/60 |
| 3,119,267 | 1/1964 | Bartky | 73/304 |
| 3,278,919 | 10/1966 | Fleming | 307/321 |
| 2,718,620 | 9/1955 | Howe | 324/61 |
| 3,012,192 | 12/1961 | Lion | 324/57 |
| 3,135,916 | 6/1964 | Tannenbaum et al. | 324/60 |

*Primary Examiner*—Stanley T. Krawczewicz
*Attorney*—James M. Thomson and Robert J. Steinmeyer

[57] ABSTRACT

Capacitance measuring circuitry is disclosed which includes a source of alternating current and a first capacitor having two plates connected on one plate to a first terminal of the alternating current source. A second capacitor is connected on one plate to the same terminal of the alternating current source. A first diode is connected at its anode to the second plate of the first capacitor and a second diode is connected at its cathode to the second plate of the first capacitor. A filter network is connected to the cathode of the first diode and the anode of the second diode with the anode of the second diode being connected to a second terminal of the alternating current source. A third diode is connected at its cathode to the second plate of the second capacitor and a fourth diode is connected at its anode to the second plate of the second capacitor. The anode of the third diode and the cathode of the fourth diode are connected to the filter network and the anode of the third diode is connected to the second terminal of the alternating current source.

The circuitry enables precise comparison and measurement of small capacitances such as those encountered with differential pressure measurement instruments.

6 Claims, 6 Drawing Figures

INVENTOR.
MICHAEL J. BLUM
BY William F. McDonald
ATTORNEY

INVENTOR.
MICHAEL J. BLUM
BY William F. McDonald
ATTORNEY

1

DIFFERENTIAL CAPACITANCE CIRCUITRY FOR DIFFERENTIAL PRESSURE MEASURING INSTRUMENTS

BACKGROUND OF THE INVENTION

The instant invention relates to capacitance measuring circuitry. It has particular application to circuitry for the precise comparison and measurement of small capacitances and small changes in capacitance. For example, it is particularly useful in capacitance measuring circuits for differential pressure measurement instruments.

Transducers or sensor gauges for differential pressure gauges have been developed. As discussed in U. S. Pat. No. 3,318,153, to Lode, these transducers can, for example, have two spaced apart fixed parallel condenser plates and a movable condenser plate situated therebetween in the form of a thin flexible metal diaphragm separating two pressure chambers in each of which one of the fixed plates is situated. Any difference in pressure between the chambers will cause the diaphragm to deflect toward the lower pressure, thereby changing the electrical capacitances between the diaphragm and the two fixed plates. Other arrangements are also possible.

Some of the problems with known capacitance measuring circuits in such applications are also discussed in the Lode patent. A related Lode U.S. Pat. No. 3,271,669, also provides additional background information.

SUMMARY OF THE INVENTION

It is an object of the instant invention to provide improved capacitance measuring circuitry which will have satisfactory linearity of measurement and at the same time precisely compare two or more capacitances with each other. It is an advantage of the instant invention that it yields a filtered output which is relatively insensitive to stray capacitances.

The capacitance measuring circuitry according to the instant invention includes a source of alternating current and a first capacitor having two plates connected on one plate to a first terminal of the alternating current source. A second capacitor is connected on one plate to the same terminal of the alternating current source. A first diode is connected at its anode to the second plate of the first capacitor and a second diode is connected at its cathode to the second plate of the first capacitor. A filter network is connected to the cathode of the first diode and the anode of the second diode, the anode of the second diode also being connected to a second terminal of the alternating current source. A third diode is connected at its cathode to the second plate of the second capacitor and a fourth diode is connected at its anode to the second plate of the second capacitor. The anode of the third diode and the cathode of the fourth diode are connected to the filter network and the anode of the third diode is also connected to the second terminal of the alternating current source.

The filter network may include a first resistor connected at one terminal to the cathode of the first diode and at a second terminal to the anode of the second diode. A second resistor may be connected at one terminal to the cathode of the fourth diode and at a second terminal to the anode of the third diode. A filter capacitor may be connected between the cathode of the first diode and the cathode of the fourth diode.

The filter network alternatively may include a first resistor connected at one terminal to the cathode of the first diode and at a second terminal to the anode of the second diode. A second resistor may be connected at one terminal to the cathode of the fourth diode and at a second terminal to the anode of the third diode. A first filter capacitor may be connected between the cathode of the first diode and the anode of the second diode and a second filter capacitor may be connected between the cathode of the fourth diode and the anode of the third diode.

According to one embodiment of the instant invention the source of alternating current may be connected to the rest of the circuitry by a transformer having a single secondary.

According to another embodiment of the instant invention the source of alternating current may be connected to the rest of the circuitry by a transformer having two secondaries, two terminals of which are common and constitute the second terminal of the alternating current source. In this case the first plates of the first and second capacitors are each connected to a separate one of the two remaining terminals. In a further alternate embodiment the two secondaries may have differing numbers of turns so that the gains on each side of the circuitry are different.

BRIEF DESCRIPTION OF THE DRAWING

Other objects and advantages of this invention will be apparent from the following description taken in conjunction with the accompanying drawings. The accompanying drawings are illustrative of advantageous embodiments of this invention.

In the drawings.

The same reference numerals have been applied to corresponding parts throughout the drawings.

DETAILED DESCRIPTION

Figure 1:
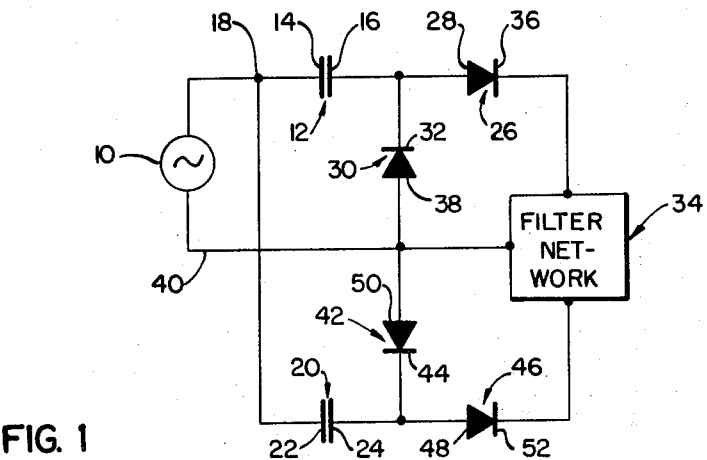
FIG. 1 illustrates capacitance measuring circuitry according to the instant invention.

Referring to FIG. 1, the capacitance measuring circuitry may be seen to include a source of alternating current 10. A first capacitor indicated generally as 12 having two plates, 14 and 16, is connected on one plate e.g. 14, to a first terminal 18 of alternating current source 10. A second capacitor indicated generally as 20 also has two plates, 22 and 24 and is connected on one plate, e.g. 22, to the same terminal 18 of alternating current source 10. A first diode indicated generally as 26 is connected at its anode 28 to second plate 16 of first capacitor 12. A second diode 30 is connected at its cathode 32 to second plate 16 of the first capacitor 12. A filter network indicated generally at 34 is connected to the cathode 36 of first diode 26 and also to anode 38 of second diode 30. Anode 38 is also connected to a second terminal 40 of alternating current source 10. A third diode indicated generally at 42 is connected at its cathode 44 to the second plate 24 of second capacitor 20. A fourth diode 46 is connected at its anode 48 to second plate 24 of second capacitor 20. Anode 50 of third diode 42 and cathode 52 of fourth diode 46 are connected to filter network 34 and anode 50 of third diode 42 is also connected to second terminal 40 of alternating current source 10. The filter network in turn may be connected to a suitable indicating instrument, not shown.

Figure 2:
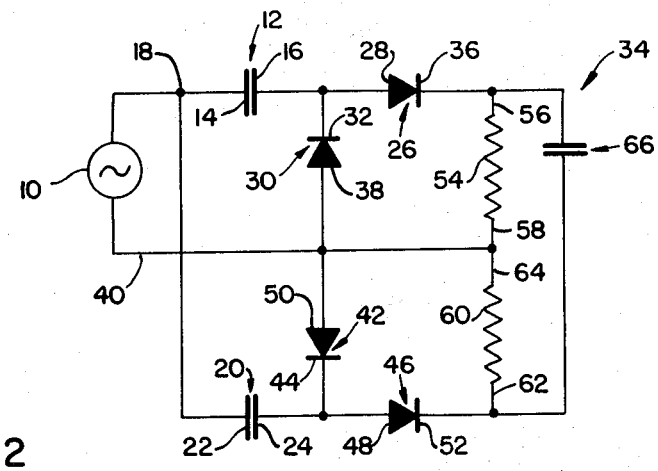
FIG. 2 illustrates alternate capacitance measuring circuitry according to the instant invention.

Referring now to FIG. 2, filter network 34 may be seen to include a first resistor 54 connected at one terminal 56 to cathode 36 of first diode 26 and at a second terminal 58 to anode 38 of second diode 30. A second resistor 60 is connected at one terminal 62 to the cathode 52 of fourth diode 46 and at a second terminal 64 to anode 50 of third diode 42. A filter capacitor 66 is connected between cathode 36 of first diode 26 and cathode 52 of fourth diode 46.

Figure 3:
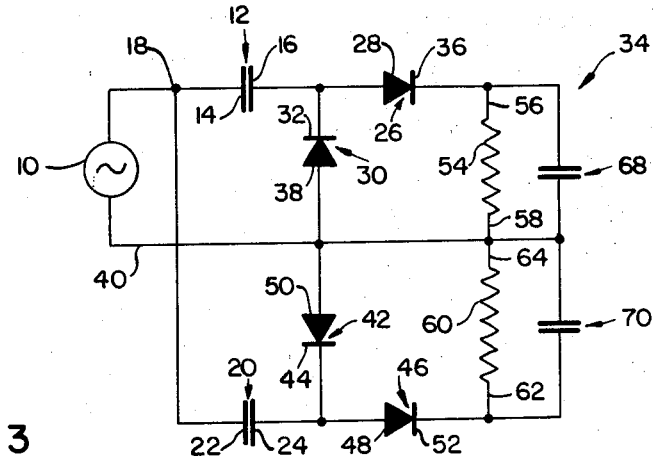
FIG. 3 illustrates another embodiment of capacitance measuring circuitry according to the instant invention.

The embodiment shown in FIG. 3 is similar to that of FIG. 2 except that here the filter network 34 includes two filter capacitors, 68 and 70. First filter capacitor 68 is connected between the cathode 36 of first diode 26 and anode 38 of second diode 30. Second filter capacitor 70 is connected between cathode 52 of fourth diode 46 and anode 50 of third diode 42.

While the preceding circuitry embodiments will convert a difference in capacitance to a d.c. voltage quite efficiently, it is usually desirable to have a high voltage in order to achieve a reasonable transducer output signal level and to reduce any temperature error due to diode drop change with temperature. The desired high voltage as well as electrical isolation may be achieved as shown in FIG. 4 by connecting the source of alternating current 10 to the rest of the circuitry by a transformer 72 having a single secondary 74 and a single primary 76.

Figure 5:
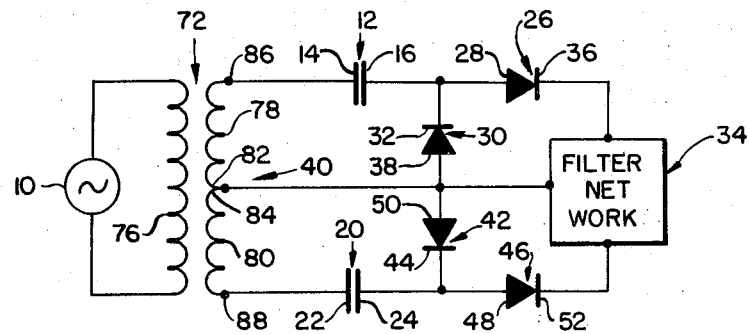
FIG. 5 illustrates another embodiment of capacitance measuring circuitry according to the instant invention.

An alternate approach is shown in FIG. 5 wherein the source of alternating current 10 is connected to the rest of the circuitry by a transformer 72 having two secondaries, 78, and 80. Two terminals, 82 and 84, of secondaries 78 and 80 respectively, are common and together constitute the second terminal 40 of a.c. source 10 previously described. The first plates 14 and 22 of first capacitor 12 and second capacitor 20 are each connected to a separate one of the two remaining terminals 86 and 88. It will be appreciated that terminals 86 and 88 each constitute a part of terminal 18 of the basic circuitry.

Figure 6:
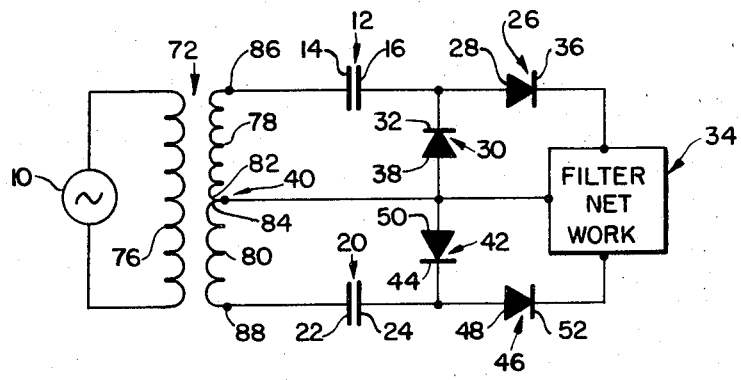
FIG. 6 illustrates another embodiment of capacitance measuring circuitry according to the instant invention.

An alternate arrangement is shown in FIG. 6 wherein the two secondaries 78 and 80 have differing numbers of turns. This circuit is particularly useful where different gains are desired on either side of the circuitry so that different weighting factors can be assigned to each side of the circuitry.

Figure 4:
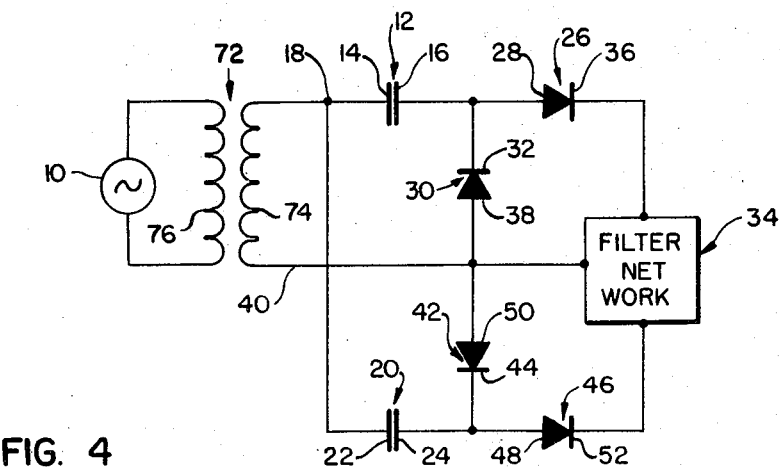
FIG. 4 illustrates another embodiment of capacitance measuring circuitry according to the instant invention.

Tests were preformed using the circuitry of FIG. 4 and embodying the filter network arrangement shown in FIG.3.

During the positive half cycle charge flows through capacitor 12, diode 26, and resistor 54 so as to charge plate 14 positively with respect to plate 16. Diode 30 is cut off during this half cycle. Similarly charge will flow through capacitor 20, diode 46, and resistor 60 so as to charge plate 22 positively with respect to plate 24. Diode 42 is cut off during this half cycle.

During the negative half cycle capacitor 12 and capacitor 20 both charge to the opposite polarity with diode 30 and diode 42 both conducting and diode 26 and diode 46 now cut off.

Ignoring the diode drops, the net charge delivered to the load in one cycle is approximately $q_1 = (V_{74} - V_{68}) C_{12}$ wherein $V_{74}$ is the voltage at the transformer secondary 74 and $V_{68}$ is the voltage at first filter capacitor 68 and $C_{12}$ is the capacitance at capacitor 12. More specifically, $V_{74}$ is measured from pole to pole on secondary 74 and $V_{68}$ is the voltage on one side of the output and $C_{12}$ is the capacitance to the center plate in the transducer capsule as described in Lode. If f equals the frequency in cycles per second and R equals the resistance of either resistor, 54 or 60, then the average voltage $V_{68} = (V_{74} - V_{68}) R_{54} C_{12} f$.

This simplifies to:

Similarly,
$$V_{68} = \frac{V_{74} R_{54} C_{12} f}{1 + R_{54} C_{12} f} \quad \text{(i)}$$

$$V_{70} = \frac{V_{74R} R_{60} C_{20} f}{1 + R_{60} C_{20} f} \quad \text{(ii)}$$

The difference between $V_{68}$ and $V_{70}$ is a differential voltage which is a measure of capacitance difference. If $R_{54} C_{12} f$ and $R_{60} C_{20} f$ are much less than one and $R_{54} = R_{60} = R$ the relationship simplifies to $$V_{68} - V_{70} = V_{74} f R (C_{12} - C_{20}) \quad \text{(iii)}$$

The tests were performed in air with a capacitor plate area of $\pi(2.6)_2/4$ square inches with an average gap of 10 mils. $V_{74}$ was 45 volts, $R = 200$ K ohms and $f = 10$ Khz. With 1.38 mils travel in the transducer, a voltage output of $1.274 - 0.182 = 1.092$ volts was obtained. The tested linearity with deflection of the capacitance plate was 0.9 percent.

It will be appreciated that the foregoing are a description of certain exemplary embodiments of the instant invention. These are for illustrative purposes only and the instant invention is not be limited thereby but only by the claims wherein what is claimed is:

I claim:

1. Capacitance measuring circuitry comprising:
    a. a source of alternating current;
    b. a first capacitor having two plates, connected on one plate to a first terminal of the alternating current source;
    c. a second capacitor having two plates connected on one plate to the same terminal of the alternating current source;
    d. a first diode connected at its anode to the second plate of the first capacitor;
    e. a second diode connected at its cathode to the second plate of the first capacitor;
    f. a filter network connected to the cathode of the first diode and the anode of the second diode, the anode of the second diode being connected to a second terminal of the alternating current source;

g. a third diode connected at its cathode to the second plate of the second capacitor; and h. a fourth diode connected at its anode to the second plate of the second capacitor; the anode of the third diode and the cathode of the fourth diode being connected to the filter network and the anode of the third diode being connected to the second terminal of the alternating current source.

2. The capacitance measuring circuitry of claim 1 wherein the filter network includes:

a. a first resistor connected at one terminal to the cathode of the first diode and at a second terminal to the anode of the second diode;

b. a second resistor connected at one terminal to the cathode of the fourth diode and at a second terminal to the anode of the third diode; and c. a filter capacitor connected between the cathode of the first diode and the cathode of the fourth diode.

3. The capacitance measuring circuitry of claim 1 wherein the filter network includes:

a. a first resistor connected at one terminal to the cathode of the first diode and at a second terminal to the anode of the second diode;

b. a second resistor connected at one terminal to the cathode of the fourth diode and at a second terminal to the anode of the third diode;

c. a first filter capacitor connected between the cathode of the first diode and the anode of the second diode; and d. a second filter capacitor connected between the cathode of the fourth diode and the anode of the third diode;

4. The capacitance measuring circuitry of claim 1 wherein the source of alternating current is connected to the rest of the circuitry by a transformer having a single secondary.

5. The capacitance measuring circuitry of claim 1 wherein the source of alternating current is connected to the rest of the circuitry by a transformer having two secondaries, two terminals of which are common and constitute the second terminal of the alternating current source, the first plates of the first and second capacitors being each connected to a separate one of the two remaining terminals.

6. The capacitance measuring circuitry of claim 5 wherein the two secondaries have differing number of turns so that the gains on each side of the circuitry are different.

* * * * *